Sept. 17, 1929.   G. B. WADSWORTH   1,728,222
ELECTRICAL SWITCH BOX
Filed Jan. 9, 1920   2 Sheets-Sheet 1
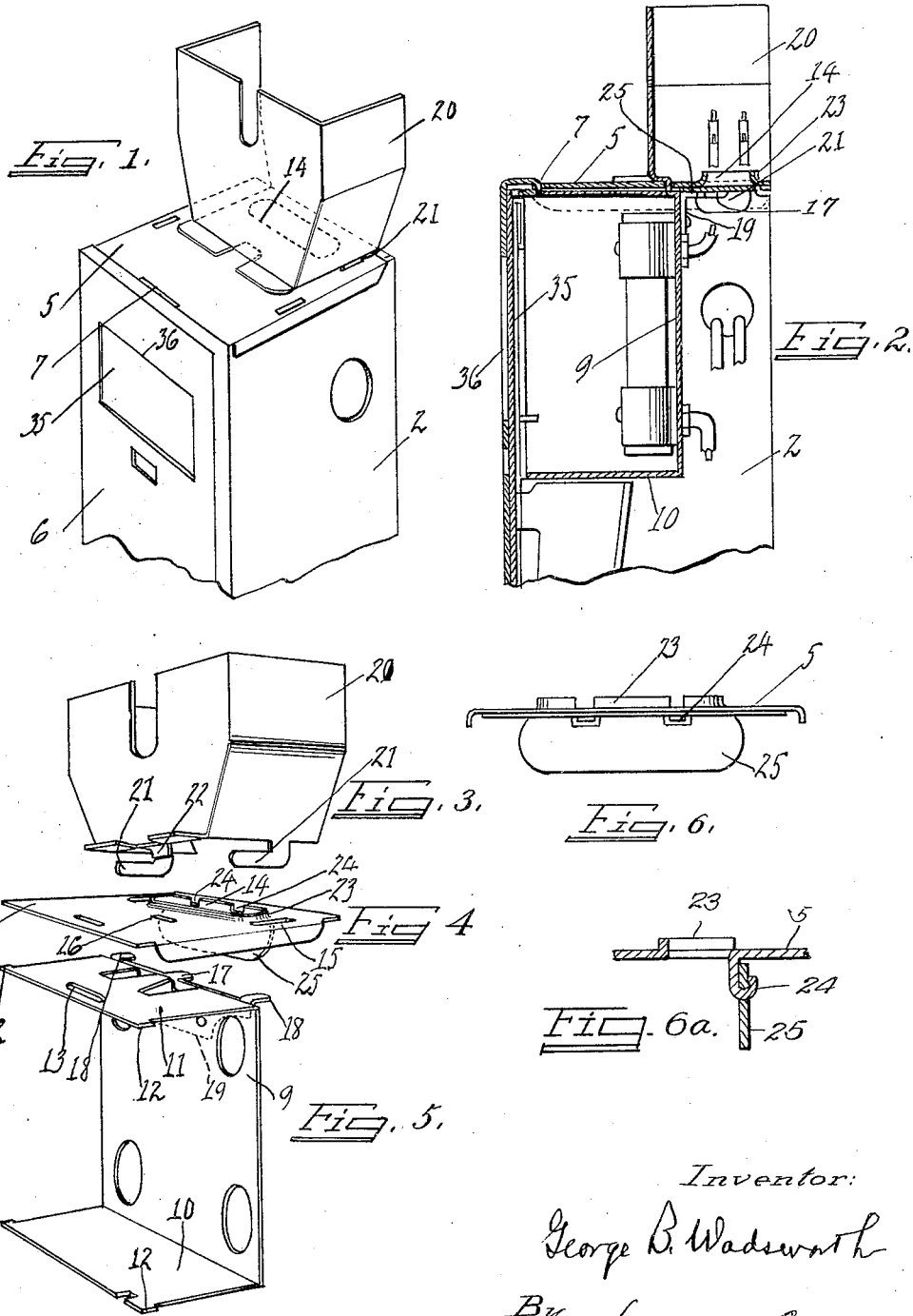

Sept. 17, 1929.  G. B. WADSWORTH  1,728,222
ELECTRICAL SWITCH BOX
Filed Jan. 9, 1920    2 Sheets-Sheet 2
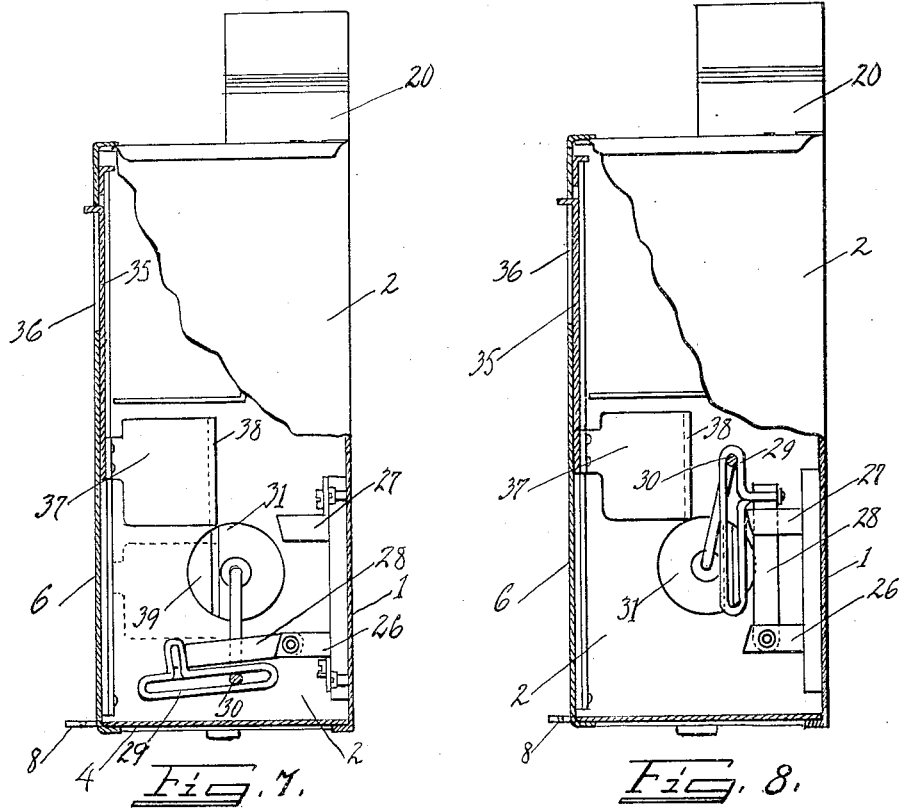
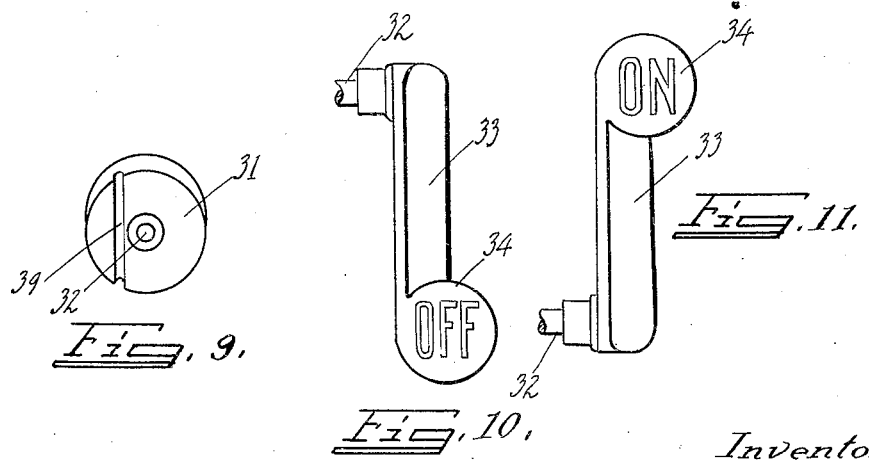
Inventor:
George B. Wadsworth
By Allen & Allen
Attorneys.

Patented Sept. 17, 1929

1,728,222

UNITED STATES PATENT OFFICE

GEORGE B. WADSWORTH, OF COVINGTON, KENTUCKY, ASSIGNOR TO THE WADSWORTH ELECTRIC MANUFACTURING COMPANY, OF COVINGTON, KENTUCKY, A CORPORATION OF KENTUCKY

ELECTRICAL SWITCH BOX

Application filed January 9, 1920. Serial No. 350,268.

My invention relates to switch boxes arranged to permit access to the fuses without access to the switch and connected so as to cut off the current from the fuses when any opening is provided for reaching the fuses. It also relates to such switches which have a meter adapted in connection therewith, so combined with the box as to prevent access to the electrical terminals at any point between the meter and the box.

Among other objects of my invention are to provide a means in connection with the meter adapted to permit access from the same into the box, but at the same time by a slight adjustment to remove the meter and still maintain the box tightly closed against access.

The box according to my invention is knockdown in construction and made of sheet metal, the parts being so arranged that they interlock, thereby permitting the installer to lock the entire box with a single padlock or seal, including in this interlocking structure the meter adapter.

In the drawings,

Figure 1 is a perspective view of the upper portion of the box illustrating the meter adapter.

Figure 2 is a vertical section of the parts shown in Figure 1.

Figure 3 is a perspective view of the meter adapter.

Figure 4 is a like view of the top plate of the box.

Figure 5 is another like view of the fuse holder.

Figure 6 is an edge elevation of the plate shown in Figure 4.

Figure 6ª is a detail showing the mounting of the meter plate.

Figure 7 is a vertical section of the box showing the switch portion thereof.

Figure 8 is a like view in elevation of the box with the cover broken away.

Figure 9 is a detail of the locking disk on the switch yoke.

Figures 10 and 11 are elevations of the handle, showing the marking impressed thereon.

The box is made preferably of pressed steel, and has integral the bottom and the two side walls 1, 2, 2, respectively. The lower end of the box is made up of a plate 4 which is flanged to engage over the sides, and is tongued into the bottom of the box. The upper end of the box is closed by the flanged plate 5, of which further description will be given, and the lid 6 of the box has a tongue 7 entering the end plate 5, and a slot at the lower end which permits the passage of the tongue 8 on the lower end plate, said tongue 8 having an eye therein for a padlock or seal. The lid is furthermore flanged throughout to seat over the sides and ends, thereby completely closing off access from without to the interior of the box.

As will be described, the lid has an opening for access to the fuses, which lid is operated in conjunction with the switch throwing devices. In notches formed in the sides of the box is supported the fuse holder, which is formed with a base 9, a lower end 10 and an upper end 11, with the two ends equipped with tongues 12 to engage in the notches in the sides of the box. The end 11 is also slotted at 13 to receive the tongue 7 on the upper end of the lid.

The top plate 5 has a wide oval slot 14 therein, alongside of which are two slots 15, and in front of which is another slot 16. Extending rearwardly from the center of the upper end 11 of the fuse holder is a tongue 17, and at each side of this tongue are two additional tongues 18. Preferably the last three mentioned tongues are on a plate 19 which is riveted to the base of the fuse holder near its upper edge.

The meter adapter has the usual shell 20 of a shape to snugly fit the meter and conceal its terminals, said shell being open at the top and bottom. There are hooks 21, 21, depending from the under side of the adapter, which pass through the slots 15, 15, and engage beneath the tongues 18 on the fuse holder. The central tongue 22 on the adapter passes into the slot 16.

The meter adapter is thus assembled with the box, the steps being to place the fuse holder in the box, set the top plate 5 in place, hook the meter adapter down, and then mount the lid, which last engages with its tongue 7 through the fuse holder and the end 5.

The metal about the oval slot 14 in the plate 5 is bent upwardly at 23, except for two tongues which are bent under at 24, 24, and inserted through slots in a metal plate 25, thereby forming a hinged flap. The ridge of metal around the oval slot, which is the line of communication between the box and the meter adapter, prevents a thief from inserting a hot or pliable piece of metal between the adapter and the top of the box, and establishing electrical connection with the line wires running to the meter. The small flap 25 may be permitted to swing loose, thereby giving access between the box and the adapter, or it may be held up to close off access to the box through the lid 5.

This closed position of the flap is retained by means of the central tongue 17 on the fuse holder, which in assembling the box may be positioned so that it engages under the flap, thereby holding it tightly against the end 5. Thus in placing the plate 5 on the box, the flap 25 may be turned up so that it rests against tongue 17.

When it is desired to disconnect the switch and remove the meter from the adapter, the lid is removed, the end 5 shifted slightly, after which the flap is raised and the end 5 then moved into place so as to cause the flap to rest on the tongue, after which the lid 6 is again set in place.

While no particular reference has been made to alternative structures, it is not desired that the claim that follows be limited beyond the fair limit of mechanical equivalents to the structures set forth therein.

Having thus described my invention, what I claim as new and desire to secure by Letters Patent is:

A sealed switch and meter protective cabinet having a removable wall provided with an opening for the passage of wires from a meter, a fuse mounting within the cabinet positioned adjacent the said opening, a hinged closure for the said opening positioned to swing to open position within the cabinet and means incorporated with the fuse mounting and the removable wall whereby the cabinet may be assembled with the hinged closure, either in the open position or in the closed position, locked against opening except by removal of the wall.

GEORGE B. WADSWORTH.